United States Patent
Hersam et al.

(10) Patent No.: US 8,734,674 B1
(45) Date of Patent: May 27, 2014

(54) METHOD OF ENHANCED LITHIATION OF DOPED SILICON CARBIDE VIA HIGH TEMPERATURE ANNEALING IN AN INERT ATMOSPHERE

(75) Inventors: Mark C. Hersam, Wilmette, IL (US); Albert L. Lipson, Evanston, IL (US); Sudeshna Bandyopadhyay, Chicago, IL (US); Hunter J. Karmel, Evanston, IL (US); Michael J. Bedzyk, Wilmette, IL (US)

(73) Assignee: Northwestern University, Evanston, IL (US)

( * ) Notice: Subject to any disclaimer, the term of this patent is extended or adjusted under 35 U.S.C. 154(b) by 61 days.

(21) Appl. No.: 13/457,070

(22) Filed: Apr. 26, 2012

Related U.S. Application Data

(60) Provisional application No. 61/479,251, filed on Apr. 26, 2011.

(51) Int. Cl.
*H01M 4/88* (2006.01)

(52) U.S. Cl.
USPC ............... 252/182.1; 252/516; 429/218.1

(58) Field of Classification Search
USPC ..................................................... 252/182.1
See application file for complete search history.

(56) References Cited

U.S. PATENT DOCUMENTS 6,406,983 B1 * 6/2002 Holzlein et al. ............ 438/522

OTHER PUBLICATIONS

Chan et al., "Solution-Growth Silicon Nanowires for Lithium-Ion Battery Anodes", ACS Nano (2010), 4(3), 1443-1450.

Zhao et al., "In-Plane Vacancy-Enabled High-Power Si-Graphene Composite Electrode for Lithium-Ion Batteries", Advanced Energy Materials (2011), 1(6), 1079-1084.

Goldman, et al., "Strain Anisotropies and Self-Limiting Capacities in Single-Crystalline 3D Silicon Microstructures: Models for High Energy Density Lithium-Ion Battery Anodes", Advanced Functional Materials (2011), 21(13), 2412-2422.

Capitani, et al., "The 6H-SiC structure model: Further refinement from SCXRD data from a terrestrial moissanite", American Mineralogist (2007), 92(2-3), 403-407.

Ng et al., "Highly Reversible Lithium Storage in Spheroidal Carbon-Coated Silicon Nanocomposites as Anodes for Lithium-Ion Batteries", Angewandte Chemie, International Edition (2006), 45(41), 6896-6899.

Nordlund, et al., "Diffuse x-ray streaks from stacking faults in Si analyzed by atomistic simulations", Applied Physics Letters (2000), 76(7), 846-848.

Hightower, et al., "Electron energy-loss spectrometry on lithiated graphite", Applied Physics Letters (2000), 77(2), 238-240.

(Continued)

*Primary Examiner* — Mark Kopec
*Assistant Examiner* — William Young
(74) *Attorney, Agent, or Firm* — Reinhart Boerner Van Deuren s.c.

(57) ABSTRACT

A method for enhancing the lithium-ion capacity of a doped silicon carbide is disclosed. The method utilizes heat treating the silicon carbide in an inert atmosphere. Also disclosed are anodes for lithium-ion batteries prepared by the method.

20 Claims, 12 Drawing Sheets

(56) References Cited

OTHER PUBLICATIONS

Norimatsu, et al., Transitional structures of the interface between graphene and 6H-SiC (0001), Chemical Physics Letters (2009), 468(1-3), 52-56.

Whittingham, "Lithium Batteries and Cathode Materials", Chemical Reviews (Washington, DC, United States) (2004), 104(10), 4271-4301.

Chou et al., "Enhanced reversible lithium storage in a nanosize silicon/graphene composite", Electrochemistry Communications (2010), 12(2), 303-306.

Zhang, et al., "Composite anode material of silican/graphite/carbon nanotubes for Li-ion batteries", Electrochimica Acta (2006), 51(23), 4994-5000.

Lin et al., "Enhanced Performance in Epitaxial Graphene FETs with Optimized Channel Morphology", IEEE Electron Device Letters (2011), 32(10), 1343-1345.

Kedzierski, et al., "Expitaxial Graphene Transistors on SiC Substrates", IEEE Transactions on Electron Devices (2008), 55(8), 2078-2085.

Vidu et al., "Improvement of the Thermal Stability of Li-Ion Batteries by Polymer Coating of LiMn2O4", Industrial & Engineering Chemistry Research (2004), 43(13), 3314-3324.

Ahn et al., "Inner shell edge profiles in electron energy loss spectroscopy", Ultramicroscopy (1985), 17(2), 105-15.

Goward, et al., "The true crystal structure of Li17M4 (M=Ge, Sn, Pb)-revised from Li22M5", Journal of Alloys and Compounds (2001), 329(1-2), 82-91.

Virdis et al., "Lattice site location of ion-implatned 8Li in Silicon Carbide", Journal of Applied Physics (2002), 91(3), 1046-1052.

Gao et al., "Evolution and structure of low-angle grain boundaries in 6H-SiC single crystals grown by sublimation method", Journal of Crystal Growth (2010), 312(20), 2909-2913.

Liang et al., "Graphene-based electrode materials for rechargeable lithium batteries", Journal of Materials Chemistry (2009), 19(33), 5871-5878.

Berger et al., "Ultrathin Epitaxial Graphite: 2D Electron Gas Properties and a Route toward Graphene-Based Nanoelectronics", Journal of Physical Chemistry B (2004), 108(52), 19912-19916.

Ren et al., "Core-Shell Li3V2(PO4)3@C Composites as Cathode Materials for Lithium-Ion Batteries", Journal of Physical Chemistry C (2008), 112(14), 5689-5693.

Chan et al., "The First-Cycle Electrochemical Lithiation of Crystalline Ge: Dopant and Orientation Dependence and Comparison with Si", Journal of Physical Chemistry Letters (2011), 2(24), 3092-3095.

Kim et al., "Si-SiC nanocomposite anodes synthesized using high-energy mechanical milling", Journal of Power Sources (2004), 130(1-2), 275-280.

Kim et al., "Carbon nanotubes (CNTs) as a buffer layer in silicon/CNTs cmoposite electrodes for lithium secondary batteries", Journal of Power Sources (2006), 162(2), 1275-1281.

Braun et al., "Lithium K(1s) synchrotron NEXAFS spectra of lithium-ion battery cathode, anode and electrylyte materials", Journal of Power Sources (2007), 170(1), 173-178.

Wang et al., "Reversible high capacity nonocomposite anodes of Si/C/SWNTs for rechargeable Li-ion batteries", Journal of Power Sources (2007), 172(2), 650-658.

Li, et al., "Effect of FePO4 coating on electrochemical and safety performance of LiCoO2 as cathode material for Li-ion batteries", Journal of Power Sources (2008), 183(2), 741-748.

Fey et a., "Thermal and electrochemical behavior of yttria-stabilized zirconia coated LiCoO2 during overcharge tests", Journal of Power Sources (2009), 189(1), 837-840.

Peled, "The Electrochemical Behavior of Alkali and Alkaline Earth Metals in Nonaqueous Battery Systems—The Solid Electrolyte Interphase Model", Journal of the Electrochemical Society (1979), 126(12), 2047-51.

Ding et al., "Change of Conductivity with Salt Content, Solvent Composition, and Temperature for Electrolytes of LiPF6 in Ethylene Carbonate-Ethyl Methyl Carbonate", Journal of the Electrochemical Society (2001), 148(10), A1196-A1204.

Wang et al., "Electrochemical Evaluation and Structural Characterization of Commercial LiCoO2 Surfaces Modified with MgO for Lithium-Ion Batteries", /Journal of the Electrochemical Society (2002), 149(4), A466-A471.

Kim et al., "Suppression of Cobalt Dissolution from the LiCoO2 Cathodes with Various Metal-Oxide Coatings", Journal of the Electrochemical Society (2003), 150(12), A1723-A1725.

Lui et al., "Electrochemical Characterizations on Si and C-Coating Si Particle Electrodes for Lithium-Ion Batteries", Journal of the Electrochemical Society (2005), 152(9), A1719-A1725.

Jung et al., "Ehnahced Stability of LiCoO2 Cathodes in Lithium-Ion Batteries Using Surface Modification by Atomic Layer Deposition", Journal of the Electrochemical Society (2010), 157(1), A75-A81.

Langford, "Preparation of transmission electron microscopy cross-section specimens using fodused ion beam milling", Journal of Vacuum Science and Technology, a Vacuum, Surfaces, and Films (2001), 19(5), 2186-2193.

Winter, "Studies on the Anode/Electrolyte Interface in Lithium Ion Batteries", Monatshefte fuer Chemie (2001), 132(4), 473-486.

Kim et al., "Superior Lithium Electroactive Mesoporous Si@Carbon Core—Shell Nanowires for Lithium Battery Anode Material", Nano Letters (2008), 8(11), 3688-3691.

Cui et al., "Carbon-Silicon Core-Shell Nanowires as High Capacity Electrode for Lithium Ion Batteries", Nano Letters (2009), 9(9), 3370-3374.

Krishnan et al., "Functionally Strain-Graded Nanoscopes for High Power Li-Ion Battery Anodes", Nano Letters (2011), 11(2), 377-384.

Tarascon et al., "Issues and challenges facing rechargeable lithium batteries", Nature (London, United Kingdom) (2001), 414(6861), 359-367.

Zhou et al., "Substrate-induced bandgap opening in epitaxial graphene", Nature Materials (2007), 6(10), 770-775.

Emtsev et al., "Towards wafer-size graphene layers by atomospheric pressure graphitization of silicon carbide", Nature Materials (2009), 8(3), 203-207.

Leapman et al., "K, L. and M shell generalized oscillator strengths and ionization cross sections for fast electron collisions", Journal of Chemical Physics (1980), 72(2), 1232-43.

Zhang et al., "Thickness dependence of microstructures in La0.9Sr0.1MnO3 thin films grown on exact-cut and miscut SrTiO3 substrates", Physica B Condensed Matter (Amsterdam, Netherlands) (2008), 403(12), 2008-2014.

Eisenberger et al., "Compton Scattering of X Rays from Bound Electrons", Physical Review A Atomic, Molecular, and Optical Physics (1970), [3] 2(2), 415-23.

Mauchamp et al., Local field effects at Li K edges in electron energy-loss spectra of Li, Li2O and LiF, Physical Review B Condensed Matter and Materials Physics (2008), 77(4), 045117.

Hass et al., "Interface structure of epitaxial graphene grown on 4H-SiC(0001)", Physical Review B Condensed Matter and Materials Physics (2008), 78(20), 205424.

Virojanadara et al., "Epitaxial graphene on 6H-SiC and Li intercalation", Physical Review B Condensed Matter and Materials Physics (2010), 82(20), 205402.

Emtsev et al., "Interaction, growth and ordering of epitaxial graphene on SiC{0001} surfaces: A comparitive photoelectron spectroscopy study", Physical Review B Condensed Matter and Materials Physics 2008, 77, 15, 155303.

Fister et al., "Total-Reflection Inelastic X-Ray Scattering from a 10-nm Thick La0.6Sr0.4CoO3 Thin Film", Physical Review Letters (2011), 106(3), 037401.

Kim, "Progress in hyperbranched polymers", Polymeric Materials Science and Engineering (1999), 80, 61 abstract.

Fister et al., "Multielement spectrometer for efficient measurement of the momentum transfer dependence of inelastic x-ray scattering", Review of Scientific Instruments (2006), 77(6), 063901-1.

(56) References Cited

OTHER PUBLICATIONS

Berger et al., "Electronic Confinement and Coherence in Patterned Expitaxial Graphene", Science (Washington, DC, United States) (2006), 312(5777), 1191-119.

Emery et al., "Structural analysis of PTCDA monolayers on epitaxial graphene with ultra-high vacuum scanning tunneling microscopy and high-resolution X-ray reflectivity", Surface Science (2011), 605(17-18), 1685-1693.

* cited by examiner

METHOD OF ENHANCED LITHIATION OF DOPED SILICON CARBIDE VIA HIGH TEMPERATURE ANNEALING IN AN INERT ATMOSPHERE

This application claims priority benefit from application Ser. No. 61/479,251 filed Apr. 26, 2011—the entirety of which is incorporated herein by reference.

This invention was made with government support under DE-AC02-06CH11357 (Subcontract 8F00661) awarded by the Department of Energy. The government has certain rights in the invention.

FIELD OF THE INVENTION

The present invention relates generally to a method of increasing the lithium-ion capacity of silicon carbide via graphitization in an inert atmosphere. Specifically, lithium ion capacity enhancement is correlated with silicon carbide doping and removal of the native oxide surface layer by thermal annealing, which renders both the bulk and surface electrically conductive. The present invention also relates to an anode for a lithium-ion battery, and a lithium-ion battery comprising such an anode, wherein the anode comprises an increased or enhanced lithium-ion capacity of silicon carbide prepared by such a method.

BACKGROUND OF THE INVENTION

The increased use of rechargeable batteries for portable electronics and electric vehicles motivates the need for smaller, lighter, safer, and more durable batteries (Goodenough, J. B. et al, *Basic Research Needs for Electrical Energy Storage*, Office of Basic Energy Sciences, Department of Energy, 2007). The capacity of a lithium-ion battery is determined largely by its electrode materials, which are currently graphite for the anode and a lithium-metal-oxide ($LiMO_2$, M=Co, Ni, Mn) or lithium-metal-phosphate (e.g., $LiFePO_4$) for the cathode (Tarascon, J. M. et al., *Nature* 2001, 414, 359-367; Whittingham, M. S., *Chem. Rev.* 2004, 104, 4271-4301). Among the many promising replacements for the anode, silicon has the highest theoretical capacity (4009 mAh/g), which corresponds to the maximum uptake of 21 Li per 5 Si atoms (Goward, G. R. et al., *J. Alloys Compd.* 2001, 329, 82-91). However, silicon suffers from a large volumetric expansion of up to 300% and amorphization during lithiation, which introduces challenges for its use as a stable battery anode upon repeated cycling (Ding, M. S. et al., *J. Electrochem. Soc.* 2001, 148, A1196-A1204; Liang, M. H. et al., *J. Mater. Chem.* 2009, 19, 5871-5878; Kim, T. et al., *J. Power Sources* 2006, 162, 1275-1281; Wang, W. et al., *J. Power Sources* 2007, 172, 650-658; Zhang, Y. et al., *Electrochim. Acta* 2006, 51, 4994-5000).

Another important factor for battery performance is the structure and composition of the solid electrolyte interphase (SEI) formed on the electrodes. In the case of graphite, the SEI layer helps protect the electrode and electrolyte from degradation, but also can be deleterious by impeding lithiation processes (Peled, E. et al., *J. Electrochem. Soc.* 1979, 126, 2047-2051). Methods have been proposed to create an artificial SEI by depositing thin films of lithium-ion conducting materials, leading to modest improvements in capacity and increases in battery lifetime (Kim, Y. J. et al., *J. Electrochem. Soc.* 2003, 150, A1723-A1725; Fey, G. T. et al., *J. Power Sources* 2009, 189, 837-840; Li, G. et al., *J. Power Sources* 2008, 183, 741-748; Ren, M. et al., *J. Phys. Chem. C* 2008, 112, 5689-5693; Vidu, R. et al., *Ind. Eng. Chem. Res.* 2004, 43, 3314-3324; Wang, Z. X. et al., *J. Electrochem. Soc.* 2002, 149, A466-A471; Jung, Y. S. et al., *J. Electrochem. Soc.* 2010, 157, A75-A81).

Composite materials hold promise for next generation lithium-ion battery anodes. In particular, silicon-carbon composites are now commonly explored as anode materials because the Si component can provide a significantly enhanced capacity, while the C component can act simultaneously as an active electrode and an electronic bridge between the particles (Liu, W. R. et al., *J. Electrochem. Soc.* 2005, 152, A1719-A1725; Ng, S. et al., *Angew. Chem., Int. Ed.* 2006, 45, 6896-6899; Kim, H. et al., *Nano Lett.* 2008, 8, 3688-3691; Wang, W. et al., *ACS Nano* 2010, 4, 2233-2241; Cui, L. et al., *Nano Lett.* 2009, 9, 3370-3374; Chou, S. et al., *Electrochem. Commun.* 2010, 12, 303-306; Chan, C. et al., *ACS Nano* 2010, 4, 1443-1450; Winter, M. et al., *Monatsh. Chem.* 2001, 132, 473-486; Zhao, C. et al., *Adv. Energy Mater.* 2011, 1, 1079-1084). Architectures of Si and C that concurrently provide high capacity and long lifetime are therefore of great interest to the lithium battery community (Krishnan, R. et al., *Nano Lett.* 2010, 11, 377-384). On the other hand, silicon carbide (SiC) is an inert refractory material that is not traditionally viewed as a promising candidate for Li-ion battery electrodes (Capitani, G. C. et al., *Am. Mineral.* 2007, 92, 403-407). For example, SiC has been identified as the inactive matrix in Si—SiC "active-inactive" composite anodes in previous Li-ion battery studies (Kim, S. et al., *J. Power Sources* 2004, 130, 275-280).

In recent years, 6H-SiC (space group $P6_3mc$) has received increased interest as a substrate for epitaxial growth of graphene (Yu-Ming, L. et al., *IEEE Electron Device Lett.* 2011, 32, 1343-1345; Kedzierski, J. et al., *IEEE Trans. Electron Devices* 2008, 55, 2078-2085; Zhou, S. Y. et al., *Nat. Mater.* 2007, 6, 770-775; Emtsev, K. V. et al., *Nat. Mat.* 2009, 8, 203-207). In particular, it has been found that high temperature annealing of SiC (0001) leads to the formation of epitaxial graphene at the surface (EG/SiC) with low defect density and superlative performance in high frequency electronic devices. The interface between epitaxial graphene and the underlying SiC substrate is carbon-rich and possesses a surface reconstruction designated as $(6\sqrt{3} \times 6\sqrt{3})R30°$; Berger, C., *J. Phys. Chem. B* 2004, 108, 19912-19916; Berger, C. et al., *Science* 2006, 312, 1191-1196; Emtsev, K. V. et al., *Phys. Rev. B* 2008, 77, 155303). Recent studies of epitaxial graphene on SiC, where Li is vapor deposited on the surface, have shown evidence for Li diffusion through graphene into the subsurface $(6\sqrt{3} \times 6\sqrt{3})R30°$ region leading to Li—Si bonding (Virojanadara, C. et al., *Phys. Rev. B* 2010, 82, 205402). It has also been shown that Li can be ion implanted into SiC interstitial sites, and the Li diffusion constants have been measured (Virdis, S. et al., ISOLDE Collaboration, *J. Appl. Phys.* 2002, 91, 1046-1052; Linnarsson, M. K. et al., *Mater. Sci. Eng., B* 1999, 61-2, 275-280)

It is therefore desirable to provide a method for substantial enhancement of the electrochemical lithiation capacity of traditionally inert SiC via surface graphitization.

SUMMARY OF THE INVENTION

In light of the foregoing, it is an object of the present invention to provide a method of increasing the lithium-ion (Li-ion) capacity of silicon carbide (SiC) via graphitization in an inert atmosphere. Specifically, the effects of various high temperature treatments and doping on the electrochemical lithiation of SiC are delineated, demonstrating that thermal processing can lead to significantly enhanced Li-ion capacity. Depth-resolved spectroscopic studies and cross-sectional imaging are presented, which indicate that Li penetrates into the bulk structure. Through synchrotron X-ray analysis, the surface structure is found to be preserved following lithiation and the lattice parameter of the underlying activated SiC structure is not substantially altered, although changes to crystallinity are observed. This extensive characterization corroborates the electrochemical lithiation data and confirms the critical role that surface treatments can play in determining the Li-ion capacity of battery electrodes.

It is another object of the invention to provide an anode for a lithium-ion battery, wherein the anode comprises silicon carbide with an increased or enhanced lithium-ion capacity. Another object of the invention is to provide a lithium-ion battery with such an anode.

Accordingly, it will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

Other objects, features, benefits and advantages of the present invention will be apparent from this summary and the following descriptions of certain embodiments, and will be readily apparent to those skilled in the art. Such objects, features, benefits and advantages will be apparent from the above as taken into conjunction with the accompanying examples, data, and all reasonable inferences to be drawn therefrom. The disclosures in this application of all articles and references, including patents, are incorporated herein by reference.

DETAILED DESCRIPTION OF THE INVENTION

Illustrating certain non-limiting aspects and embodiments of this invention, a method for enhancing lithiation of doped 6H-SiC (0001) via high temperature growth in an inert atmosphere of epitaxial graphene is provided. Specifically, the method comprises providing a doped silicon carbide and heat treating the doped silicon carbide in an inert atmosphere. By "inert atmosphere" as used herein is meant unreactive with the SiC, including but not limited to the prevention of oxidation of the same. Inert atmospheres include but are not limited to argon at atmospheric pressure, argon at less than atmospheric pressure (less than 1 Torr to about 1×10$^{-5}$ Torr), high vacuum at pressures less than 1×10$^{-5}$ Torr, or ultra-high vacuum (UHV) at pressures less than 1×10$^{-9}$ Torr, and preferably less than 1×10$^{-10}$ Torr. Preferably, the doped silicon carbide is a doped 6H-SiC (0001) sample, and even more preferably a nitrogen-doped (or n-type) 6H-SiC (0001) sample. Subsequent lithiation of the heat treated, doped silicon carbide affords an electrochemical lithiation capacity up to 57 times greater than the as-received doped sample. The SiC can be, for example, a SiC wafer (substrate) or powdered SiC.

Electrochemical Lithiation

Figure 1:
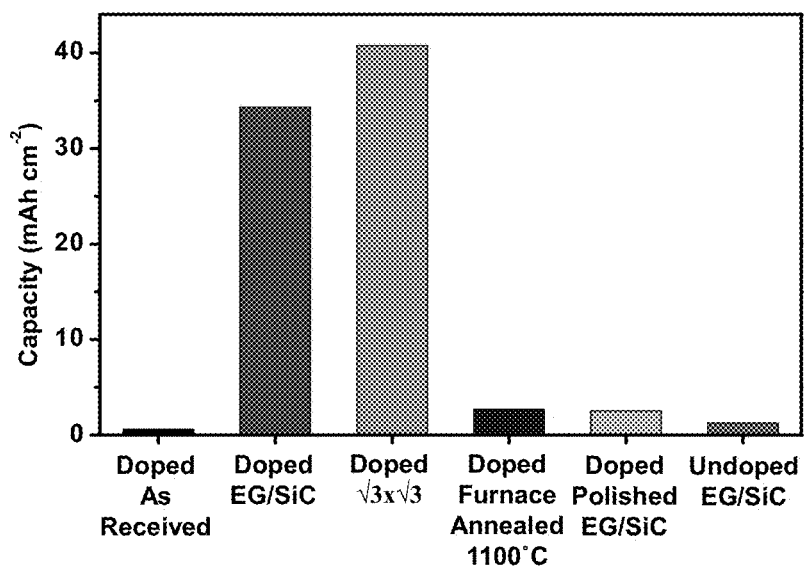
FIG. 1 depicts a graph comparing the first cycle lithiation capacity for a variety of 6H-SiC (0001) single crystal samples.

A nitrogen-doped as-received sample of 6H-SiC (0001) that has not undergone thermal treatments and therefore possesses a native oxide layer is used as a baseline for SiC lithiation studies. The sample has a sheet resistance in excess of 10 MΩ☐$^{-1}$ (wherein "Ω☐$^{-1}$" refers to "ohms per square"). The first lithiation capacity (as defined in the Examples below) is 0.6 mAh cm$^{-2}$ as shown in comparison with other SiC samples in FIG. 1. This small, apparent capacity can primarily be attributed to solid electrolyte interphase (SEI) formation due to reaction with the electrolyte at electrochemical potentials below 1.5 V vs. Li. With respect to FIG. 1, the samples are n-type doped (to a resistivity of 0.044 $\Omega \cdot cm$) as-received SiC, SiC graphitized in UHV (EG/SiC), $\sqrt{3} \times \sqrt{3}$ reconstructed SiC formed in UHV at 1100° C., SiC annealed in inert argon flow at 1100° C. in a furnace, and a UHV graphitized sample that is polished to remove the graphene. The graphitized undoped SiC sample is produced via furnace growth.

In an embodiment of the invention, a sample of EG/SiC (epitaxial graphene at the surface of SiC) is prepared by graphitization of a doped SiC sample in ultra-high vacuum (UHV) ("doped EG/SiC") to form multiple, as for example, a mix of single and bilayer, layers of graphene with small portions of the $(6\sqrt{3} \times 6\sqrt{3})R30°$ reconstruction exposed on the Si-face. Thus, the heat-treated doped SiC can, generally, have $(6\sqrt{3} \times 6\sqrt{3})R30°$ reconstruction and graphitic layers on its surface. The sheet resistance of this sample is 0.2 $\Omega\square^{-1}$, i.e. almost 8 orders of magnitude lower than the as-received sample. This sample has a first lithiation capacity of 34 mAh cm$^{-2}$, which is 57 times greater than the doped as-received sample. It is believed that this enhanced lithium insertion capacity is due to a combination of factors such as, for example, surface conductivity, bulk doping, and defects induced during thermal processing. To understand how each of these factors contribute to the increased lithiation capacity, SiC samples with various dopant levels and surface structures are investigated.

As another non-limiting example, to test if the graphene layers play a crucial role in the lithiation process, a doped sample is annealed in UHV to attain the $\sqrt{3} \times \sqrt{3}$ surface reconstruction. This structure precedes the formation of the $(6\sqrt{3} \times 6\sqrt{3})R30°$ (Berger, C. et al., *J. Phys. Chem. B* 2004, 108, 19912-19916, incorporated herein by reference), and therefore no graphene layers are formed on this surface. This sample is then placed into an inert atmosphere to minimize surface oxidation before lithiation, thereby maintaining sheet resistance on the order of the graphitized sample. The first lithiation capacity of this $\sqrt{3} \times \sqrt{3}$ sample is similar to that of the fully graphitized sample (41 mAh cm$^{-2}$), which indicates that the graphene itself does not play a critical role in SiC lithiation. It should however be noted that this reconstruction degrades, i.e. oxidizes, in air while graphitized samples are exceptionally inert, presenting clear practical advantages for EG/SiC.

To determine whether the lithiation capacity is caused only by heating the bulk SiC, a doped sample is heat treated to at least about 1100° C. (the same temperature used to form the $\sqrt{3} \times \sqrt{3}$ reconstruction in UHV) in a flow of argon at atmospheric pressure. The increased pressure reduces the evaporation rate of Si and O, thereby inhibiting the formation of the $\sqrt{3} \times \sqrt{3}$ reconstruction and removal of the surface oxide. This sample possesses a sheet resistance greater than 10 $M\Omega\square^{-1}$. The capacity of this sample is 2.7 mAh cm$^{-2}$, which is greater than that of the as-received sample but is still an order of magnitude smaller than the graphitized or $\sqrt{3} \times \sqrt{3}$ samples. This intermediate lithium capacity may be due to changes in the native oxide thickness or other effects of the heat treatment.

In still another non-limiting example, and to further show that the surface oxide removal is a critical factor in SiC lithiation, a UHV graphitized sample (prepared identically as the doped EG/SiC sample) is mechanically polished with diamond lapping paste to expose the bare SiC crystal. During and after polishing the native oxide reforms on the SiC surface giving a sheet resistance in excess of 10 $M\Omega\square^{-1}$. The capacity of this sample is 2.5 mAh cm$^{-2}$, similar to the heat treated sample.

The effects of doping can be elucidated through the use of an undoped (semi-insulating) EG/SiC sample as a comparison to the doped case. After graphitization by furnace annealing, the surface is almost completely covered with monolayer graphene, leading to a sheet resistance on the Si-face of 5 $k\Omega\square^{-1}$. This value is substantially higher than the doped EG/SiC sample since the SiC does not contribute significantly to the conductivity. The lithiation capacity of this undoped EG/SiC sample is 1.3 mAh cm$^{-2}$, illustrating the importance of doping in the lithiation of SiC.

These experiments define the various factors that are necessary to enhance the lithiation capacity of SiC. Doping is clearly important as it increases the electrical conductivity of the bulk SiC, thus enabling the electron transfer needed for electrochemistry. Doping may also play a role by lowering the insertion energy for Li in SiC (Chan, M. K. Y. et al., *J. Phys. Chem. Lett.* 2011, 2, 3092-3095, incorporated herein by reference), although it is difficult to deconvolute this factor experimentally from that of increased conductivity. In addition, removal of the native oxide from the SiC surface is critical, presumably because it enables improved surface electrical conductivity. The removal of the native oxide also eliminates the need for Li diffusion through that barrier coating. High temperature annealing may also introduce defects in the surface and/or bulk of SiC that promotes Li diffusion.

Spectroscopy and Cross-Sectional Imaging

Figure 2:
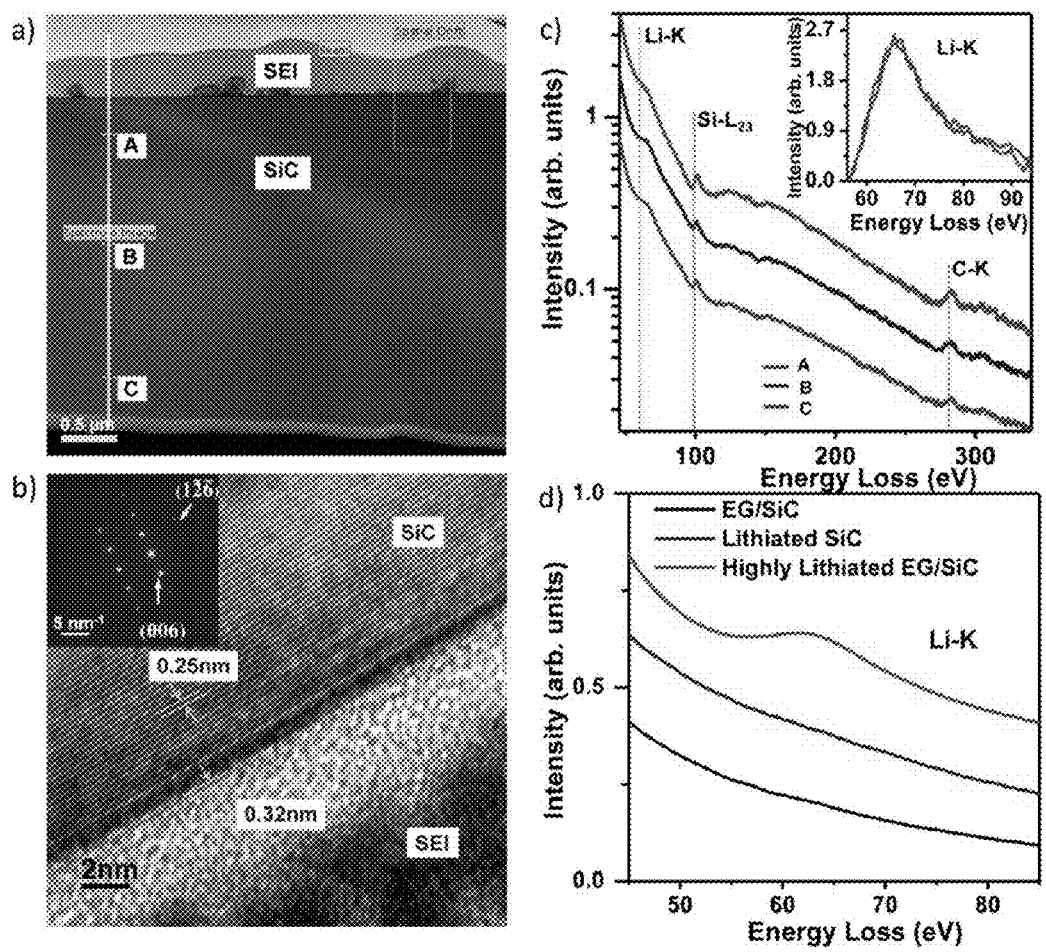
FIG. 2 are TEM micrographs and EELS spectra for a highly lithiated (14 mAh cm-2) graphitized SiC (EG/SiC) sample (Si-face); a) cross-section of the sample; b) cross-sectional HRTEM image observed along the [2 1 $\bar{2}$ 0] direction of 6H-SiC near the SiC/SEI interface; c) EELS spectra from different depths of the sample indicated by A, B and C in a) (inset: EELS background subtracted spectra for Li—K edge from approximately 0.4 μm (A) and 2.6 (C) within the SiC region); d) Comparison of Li—K edge of highly lithiated EG/SiC with as-received SiC (lithiated to 0 V) and non lithiated EG/SiC at ~0.8 μm depth.
Figure 11:
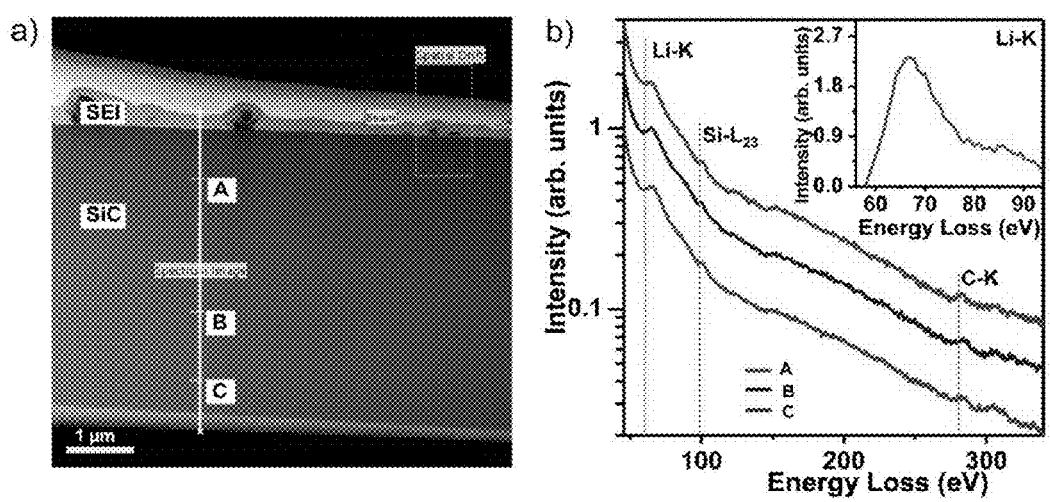
FIG. 11 shows TEM micrographs and EELS spectra for highly lithiated (14 mAh cm$^{-2}$) graphitized SiC (EG/SiC) sample (C-face); a) cross-section of the sample; b) EELS spectra from different depths of the sample indicated by A, B, and C in (a).

Direct observation of the spatial location of Li in the lithiated SiC crystal below the EG/SiC (0001) interface is achieved by cross-sectional transmission electron microscopy (TEM) in combination with electron energy loss spectroscopy (EELS). These samples are prepared by focused ion beam (FIB) lift-out methods. In particular, a Pt beam induced deposited (BID) protective layer is created on top of the SEI layer to avoid surface damage during the FIB preparation process. The resulting images and spectra are summarized in FIG. 2. A low magnification cross-sectional TEM image of an EG/SiC sample (Si-face) lithiated to ~14 mAh cm$^{-2}$ is shown in FIG. 2a. The C-face SiC (0 0 0 $\bar{1}$) data is shown in FIG. 11. As seen in FIG. 2a, an approximately 0.5 $\mu m$ SEI layer and the Pt BID layer are clearly resolved above the EG/SiC surface. FIG. 2b shows a representative high resolution TEM (HRTEM) image of the same sample near the SEI SiC interface, observed along the [2 1 $\bar{2}$ 0] direction. The SiC (0001) crystal lattice structure is clearly observed in this sample. The selected area diffraction (SAD) pattern, using a 10 $\mu m$ SAD aperture (shown as an inset), further indicates that the SiC structure remains intact following lithiation. The HRTEM image shows a 0.32 nm spacing in between the SiC crystalline region and SEI, which indicates a single layer of graphene.

Figure 12:
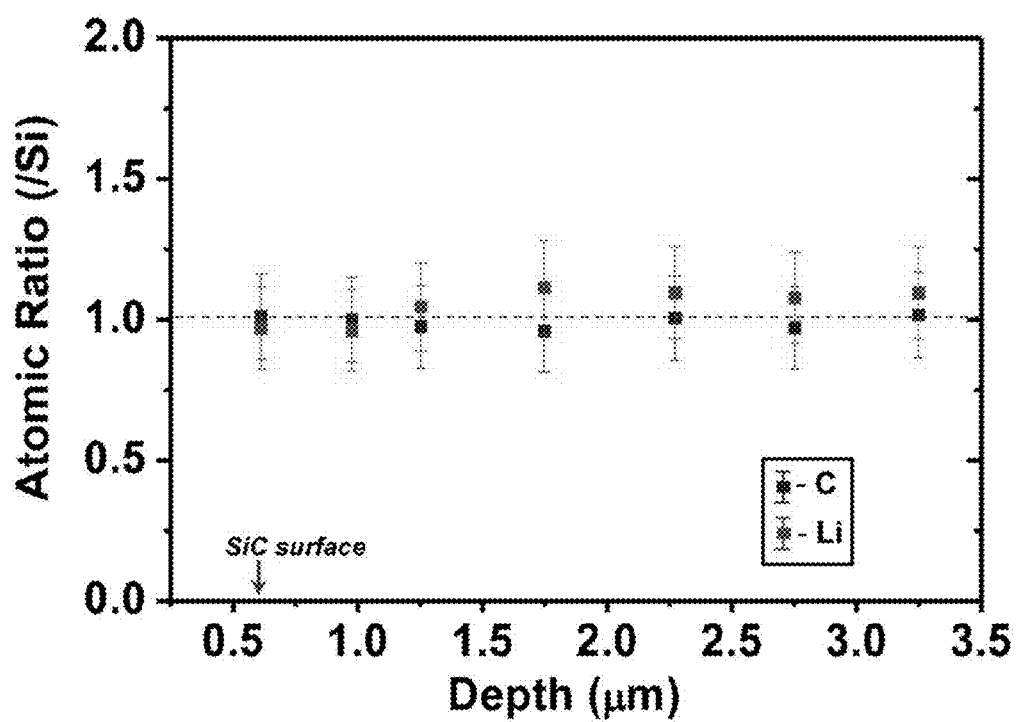
FIG. 12 is an EELS depth profile for the highly lithiated (14 mAh cm$^{-2}$) EG/SiC sample (Si-face).

To probe the Li depth profile within the SiC, EELS measurements are performed. The EELS results of FIG. 2c are representative spectra taken along the line shown in FIG. 2a (near points A, B, and C) having depths of approximately 0.4, 1.4, and 2.6 $\mu m$ below the SiC surface, respectively. The EELS spectra have Li, Si, and C signals in the bulk SiC region at all depths measured. Background corrected Li—K edge (Braun, A. et al., *J. Power Sources* 2007, 170, 173-178 and Hightower, A. et al., *Appl. Phys. Lett.* 2000, 77, 238-240, both incorporated herein by reference) from approximately 0.4 $\mu m$ and 2.6 $\mu m$ inside the SiC crystalline region are shown in the inset of FIG. 2c. These spectra show significant Li concentration in the crystalline SiC even at a depth of 2.6 $\mu m$. Furthermore, the Li K-edge position indicates that the Li is not metallic (Mauchamp, V. et al., *Phys. Rev. B* 2008, 77, 045117, incorporated herein by reference). Quantification of the relative Si and Li EELS signals show that the Li to Si atomic concentration ratio is approximately {1±0.2}:1 (FIG. 12). A 1:1 Li to Si ratio indicates a maximum capacity of 670 mAh g$^{-1}$, which is approximately double that of graphite.

To address the possibility that the TEM/EELS preparation methods transported Li from the SEI into the bulk, a lithiated (18 mAh cm$^{-2}$) EG/SiC sample is prepared using traditional cross-sectional TEM sample preparation methodology (Williams, D. B. et al., in *Transmission electron microscopy: a textbook for materials science*, Vol. 1, Plenum Press, New York 1996, incorporated herein by reference). The sample prepared by this method also shows a similar Li concentration ({0.72±0.1}:1 Li to Si) inside the bulk SiC.

Figure 8:
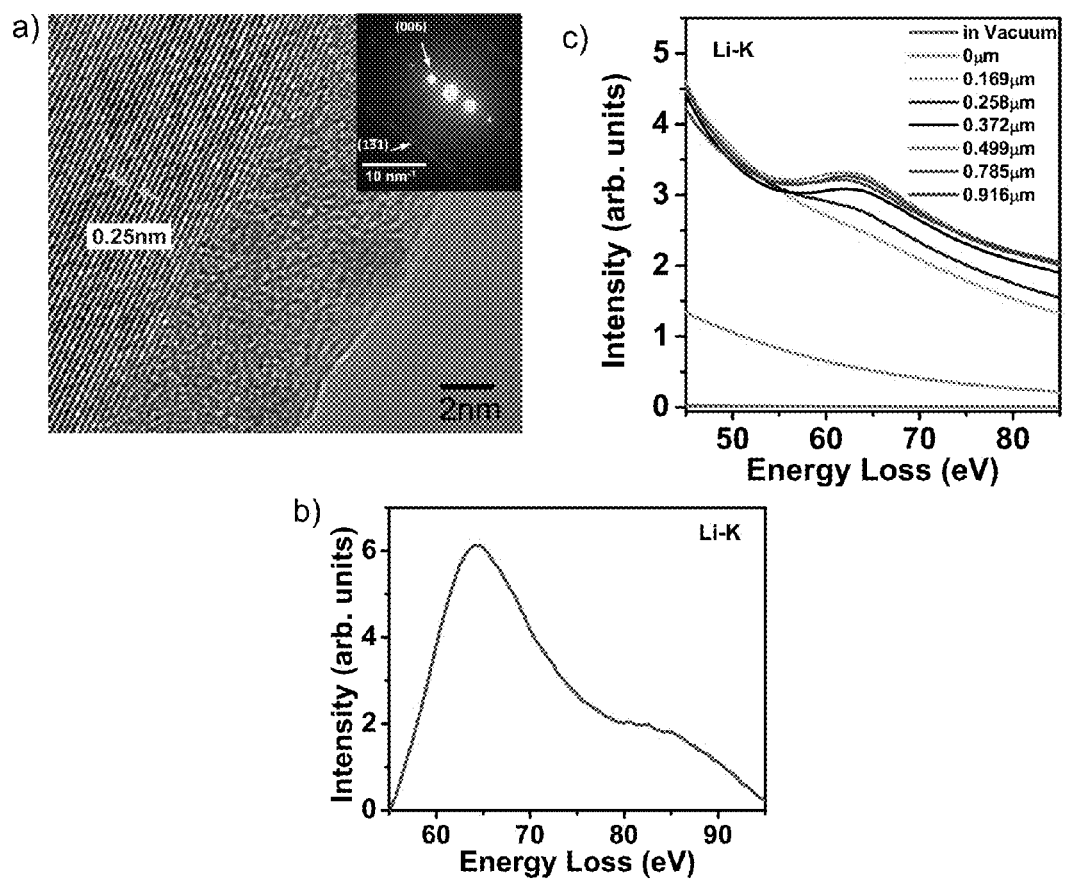
FIG. 8 are TEM and EELS of a highly lithiated (18.4 mAh cm$^{-2}$) EG/SiC sample, which is prepared using the traditional cross-sectioning technique; a) cross-sectional TEM image observed along the [3 1 $\bar{2}$ 0] direction of 6H-SiC and the corresponding selected area diffraction (SAD) pattern (inset); b) EELS background subtracted spectra for the Li—K edge from approximately 1 μm within the sample; c) EELS spectra for the Li—K edge from different depths within the sample.

For comparison purposes, cross-sectional TEM and EELS data are also taken for lithiated as-received SiC (galvanostatically driven to 0 V) and nonlithiated EG/SiC samples (with traditional TEM preparation protocols). The SiC (0001) crystal structure is clearly observed in the HRTEM images for both samples. EELS Li—K edge spectra for lithiated and nonlithiated EG/SiC along with lithiated as-received SiC at ~0.8 μm depth are shown in FIG. 2d. In contrast to the lithiated EG/SiC, EELS data for lithiated as-received SiC show no evidence of the Li K-edge signal at ~0.8 μm depth (FIG. 8). These results are consistent with the observed Li capacity of the systems.

Figure 3:
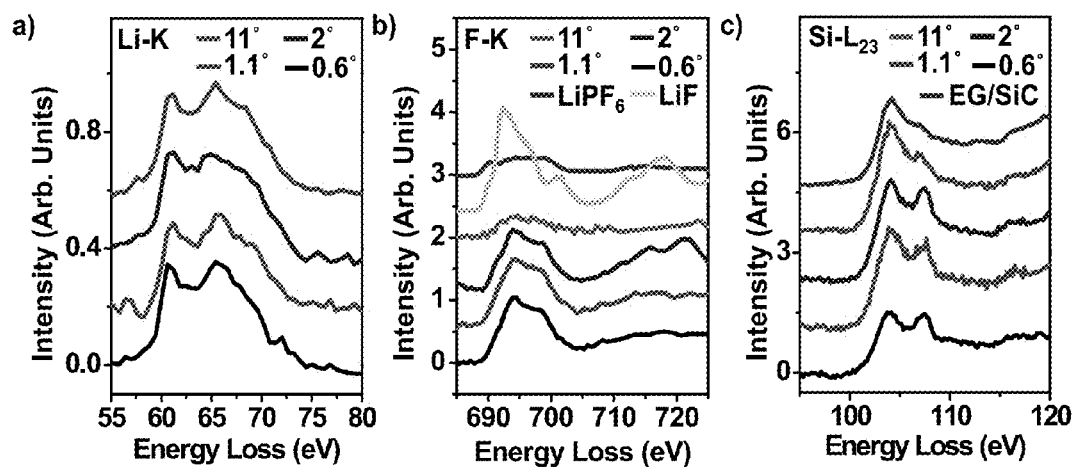
FIG. 3 is an inelastic X-ray scattering (IXS) data of the 14 mAh cm$^{-2}$ lithiated EG/SiC sample for the a) Li K-edge; b) F K-edge with reference spectra of LiF and LiPF$_6$; and c) Si L$_{23}$-edge with a nonlithiated EG/SiC sample as a reference.

Inelastic X-ray scattering (IXS) is also used to gain more evidence for the distribution of lithium in the 14 mAh cm$^{-2}$ lithiated EG/SiC. IXS provides spectroscopic information that is similar to EELS, but due to the high-penetrating-power of hard X-rays, does not require vacuum or elaborate sample processing. The relative IXS signal is proportional to the overall stoichiometry of the sample (Fister, T. T. et al., *Phys. Rev. Lett.* 2011, 106, 037401 and Eisenberger, P. et al., *Phys. Rev. A* 1970, 2, 415-423, both incorporated herein by reference). IXS probes the distribution of an element at or below an interface by controlling the penetration depth of the X-ray beam into the sample by changing the angle of incidence. IXS spectra for Li, F, and Si are collected at incident angles of 0.6°, 1.3°, 2°, and 11° with respect to the surface plane, which have 1/e penetration depths in SiC of approximately 0.5, 1.1, 1.6, and 8.5 μm, respectively. The results are shown in FIG. 3. The IXS spectrum of the Li K-edge (FIG. 3a) does not change substantially with incident angle. This observation indicates that the Li distribution extends in excess of the largest probe depth (8.5 μm). In contrast, the F K-edge spectra (FIG. 3b) is unlike that of Li, and shows a significant decrease in signal at 11° confirming that fluorine is only present at the surface (i.e, in the SEI). The F K-edge spectra appear to be a combination of LiF and residual LiPF$_6$ salt. The Si L$_{23}$-edge spectra (FIG. 3c) shows a reduced Si signal at 0.6° due to attenuation of the X-ray beam through the surface SEI layer. It is noted that the IXS spectra for the lithiated sample shows enhanced intensity in the low angle spectra near 107 eV, with respect to the non-lithiated SiC. At higher penetration conditions, the spectrum begins to closely resemble the EG/SiC and as-received SiC control samples. Based on the variation in X-ray penetration with incident angle, these results indicate that lithiation changes the Si chemical bonding in the top 2-8 μm of the sample.

Figure 4:
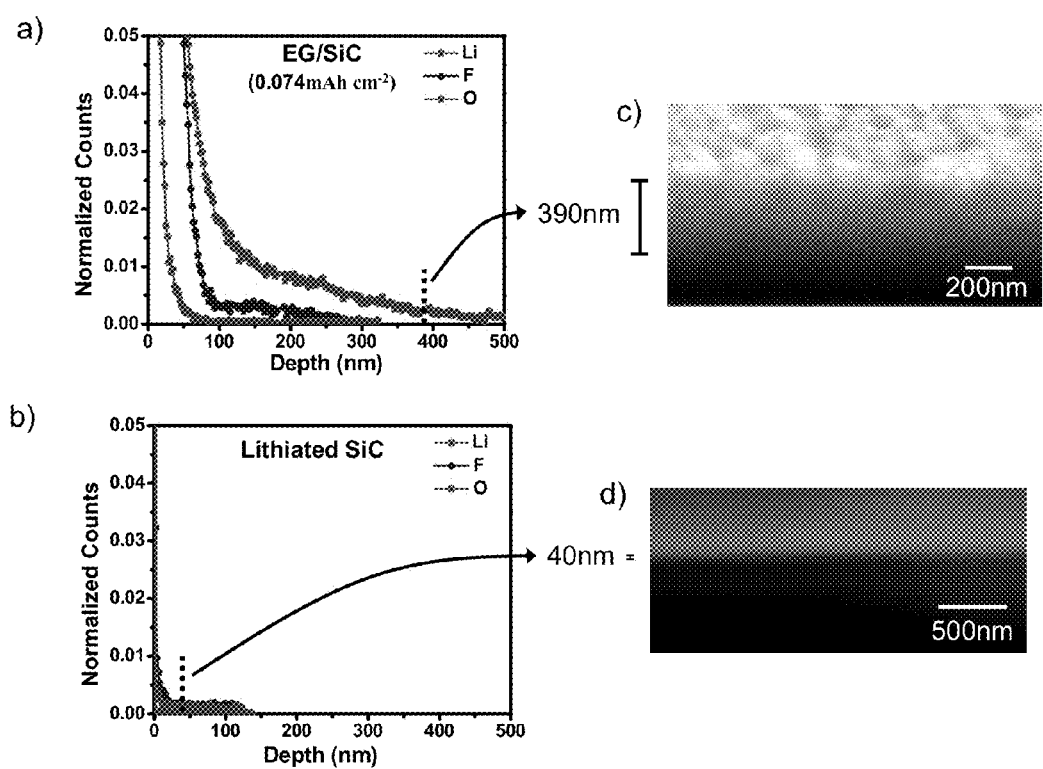
FIG. 4 is depth resolved secondary ion mass spectrometry (SIMS) for a) a graphitized SiC sample lithiated with 0.074 mAh cm$^{-2}$ of charge; and b) an as-received SiC sample lithiated to 0 V; c) and d) are focused ion beam (FIB) milled cross-sectional scanning electron microscopy (SEM) images of the samples in a) and b), respectively.

The initial stages of lithiation and delithiation in EG/SiC are explored via time of flight secondary ion mass spectrometry (SIMS) and cross-sectional scanning electron microscopy (SEM). Elemental depth profiles measured with SIMS are shown in FIGS. 4a and 4b for 0.074 mAh cm$^{-2}$ lithiated graphitized SiC, which is more than two orders of magnitude less lithiated than the samples used for EELS and IXS and as-received SiC lithiated to 0 V. The Li distribution extends deeper within the sample than either oxygen or fluorine, indicating that lithium extends into the SiC and is not associated with the formation of a SEI layer. The as-received SiC in contrast shows no penetration of Li, F, or O deeper than approximately 10 nm into the sample, although Li, F, and O are present on the surface of the sample as part of the SEI. The lack of Li in the bulk of the as-received SiC despite the presence of Li in the surface SEI layer demonstrates that the 5 kV Ga ions used for SIMS sputtering do not significantly drive Li ions into the sample by forward scattering.

FIGS. 4c and 4d show FIB-prepared cross-sectional SEM images of the same samples measured in FIGS. 4a and 4b. In particular, FIG. 4c reveals that the 0.074 mAh cm$^{-2}$ lithiated EG/SiC sample possesses a brighter and inhomogeneous region within 150 nm of the surface, which can be associated with the SEI. More significantly, the region between 150 nm and 390 nm below the surface continues to show SEM contrast, which corresponds to the depth where lithium is detected with SIMS. On the other hand, the cross-sectional SEM image for lithiated as-received SiC (FIG. 4d) shows only a thin layer that is less than 40 nm in thickness, again in agreement with the SIMS results.

Figure 5:
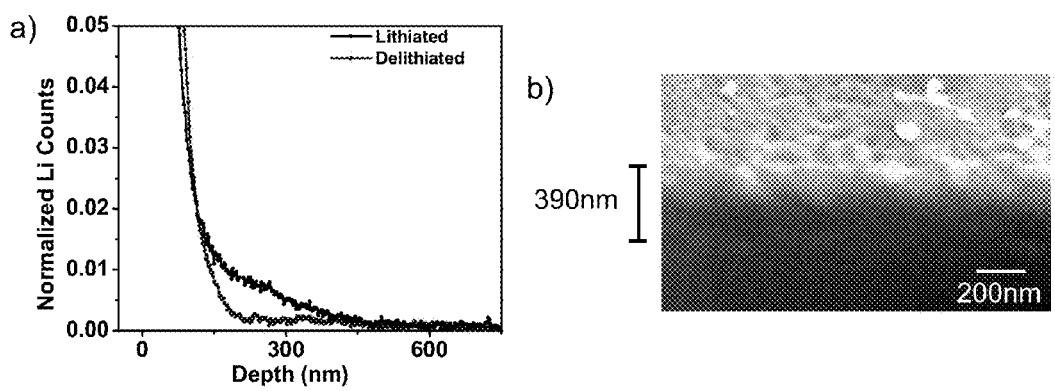
FIG. 5 a) SIMS depth profile of a 0.074 mAh cm$^{-2}$ lithiated graphitized SiC wafer and a portion of that wafer which was delithiated by 0.037 mAh cm$^{-2}$; and b) cross-sectional SEM of the delithiated sample.
Figure 9:
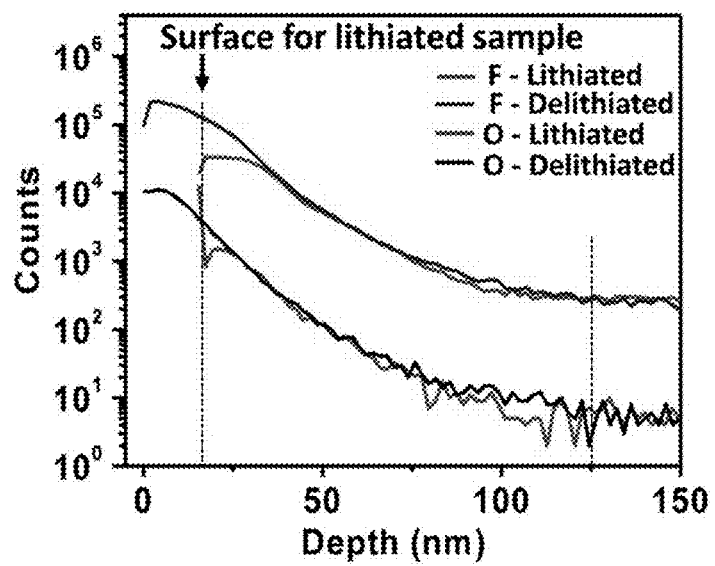
FIG. 9 is a SIMS elemental depth profile for F and O of a 0.074 mAh/cm$^2$ lithiated graphitized SiC wafer and a portion of that wafer which is then delithiated by 0.037 mAh/cm$^2$.

The reversibility of the lithiation process is also explored with SIMS. Specifically, the sample lithiated to 0.074 mAh cm$^{-2}$ is split into two pieces. One half of this sample is then delithiated by 0.037 mAh cm$^{-2}$. SIMS measurements of the Li depth profiles for the two samples are then compared (FIG. 5a). The lithiated curve is shifted in depth by 21 nm to account for the increased SEI thickness in the delithiated sample (FIG. 9). Following this shifting procedure, a substantial drop of Li is observed in the delithiated sample between 170 nm and 400 nm in depth, thus indicating that the lithiation reaction is at least partially reversible. The cross-sectional SEM images in FIG. 4c and FIG. 5b show that upon delithiation the region underneath the SEI darkens, which is consistent with the reduction in lithium concentration observed in the SIMS measurements.

Figure 6:
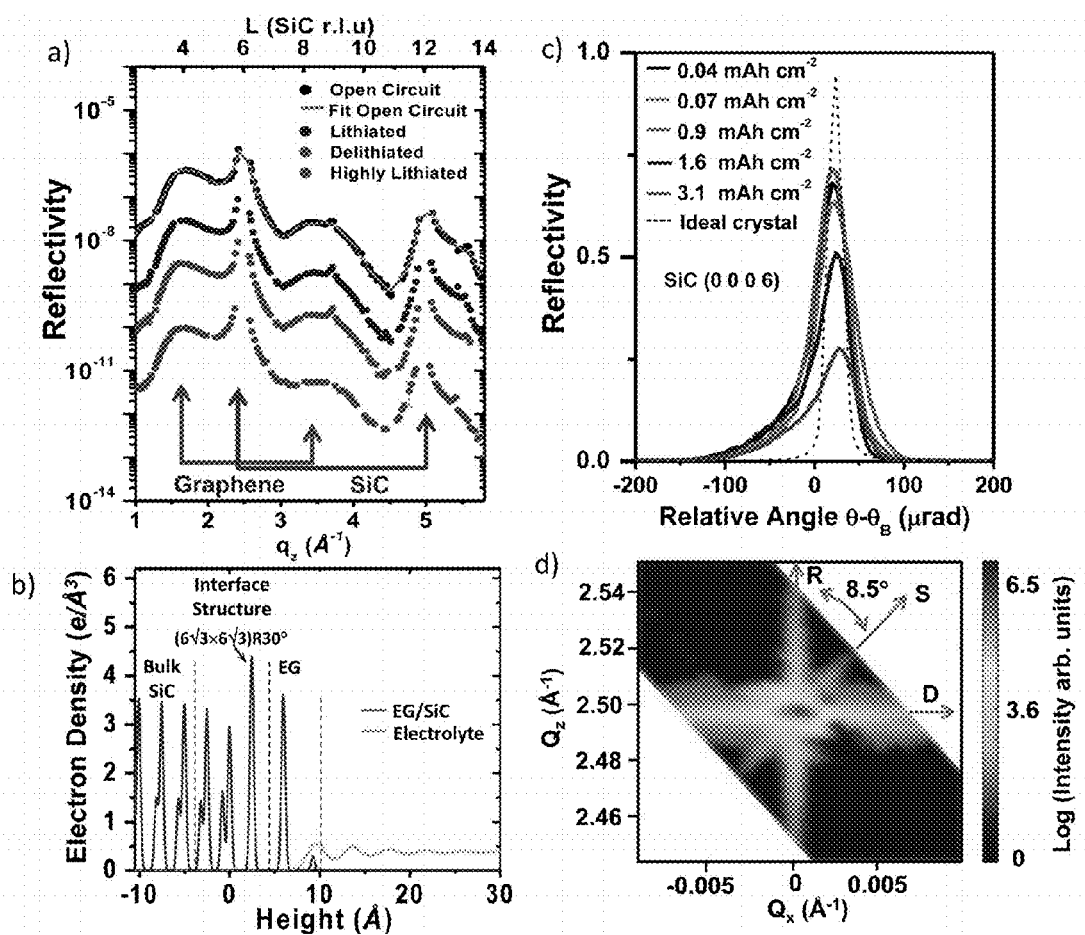
FIG. 6 a) In situ X-ray reflectivity of graphitized SiC sample in the electrolyte at open circuit voltage, after lithiation (0.074 mAh cm$^{-2}$), after delithiation (0.037 mAh cm$^{-2}$), and a different graphitized SiC sample after 14 mAh cm$^{-2}$ lithiation, offset vertically for clarity; b) derived interfacial electron density profile measured at the open circuit voltage; c) absolute reflectivity data at SiC (0006) Bragg peak at different lithiation doses ($\theta_B$ is the Bragg angle for SiC (0006)) and the SiC (0006) reflectivity predicted by dynamical diffraction theory for an ideal perfect crystal; and d) 2D reciprocal space map near the SiC (0006) Bragg reflection for 3.7 mAh cm$^{-2}$ lithiated EG/SiC. "R", "S", and "D" indicate the surface CTR reflectivity, lithiation-induced streak, and bulk SiC diffuse scattering, respectively.

In situ X-ray reflectivity (XRR) measurements are performed to gain additional information about the structure of the SiC, surface reconstruction, and graphene layers following lithiation. The in situ XRR results show that the EG/SiC interfacial structure is similar to that measured in air (Emery, J. D. et al., *Surf. Sci.* 2011, 605, 1685-1693, incorporated herein by reference) when the EG/SiC is placed in the electrolyte at open circuit voltage. In situ XRR measurements are also performed during the lithiation and delithiation processes. Reflectivity curves at different states of lithiation are shown in FIG. 6a. The XRR signal between the bulk SiC (000L) Bragg peaks for the in situ sample in FIG. 6a shows that the interfacial structure of the EG/SiC is not noticeably altered by lithiation. XRR data for a graphitized SiC sample at a highly lithiated state (~14 mAh cm$^{-2}$, more than two orders of magnitude greater than the in situ data) are also collected to observe if there is any substantial structural change in graphene or SiC at high lithiation dose. There are only small changes in the XRR indicating that the graphene surface layer is not substantially modified and the majority of the SiC structure remains intact at this lithiation state. FIG. 6b shows the extracted electron density of a nonlithiated graphitized silicon carbide (EG/SiC), at open circuit voltage, using a model based least squares fit analysis to the XRR data. The calculated reflectivity profile (solid line) in FIG. 6a is the best fit from which the electron density profile (FIG. 6b) is determined. The result shows a high degree of graphene single layer coverage (~87%) with some bilayer coverage (~7%). There is evidence of the (6√3×6√3)R30° reconstruction layer at the interface and a SiC surface with structural and stoichiometric modifications within the top two bilayers. This resultant structure may be due to structural relaxations that arise during growth (Hass, J. et al., *Phys. Rev. B* 2008, 78, 205424, incorporated herein by reference).

While the surface structure of the SiC does not change significantly during lithiation, the measured reflectivity of 6H-SiC (0006) bulk Bragg peak drops with lithiation dose, as shown in FIG. 6c ($\theta_B$ is the Bragg angle for SiC (0006)). Such a measurement is extremely sensitive to the perfection of the SiC bulk crystal within the dynamical diffraction X-ray extinction depth of 1 μm into the SiC, at the 6H-SiC (0006) Bragg peak. The Bragg peak shows little changes until the lithiation dose exceeds 1 mAh cm$^{-2}$ and then the (0006) Bragg peak intensity decreases by a factor of ~2.5 at 3.1 mAh cm$^{-2}$ of lithiation. No substantial amount of attenuation is expected at the SiC (0006) Bragg peak due to SEI formation in these measurements with a photon energy of 17 keV. Hence, the change of peak intensity and shape is attributed to a decrease in bulk SiC crystallinity due to Li incorporation into the system.

During the in situ lithiation process, the emergence of a new streak in the 2D reciprocal space map (RSM) (shown as "S" in FIG. 6d) is observed near the SiC (0006) Bragg reflection. The intensity of this streak grows with increasing lithiation dose, suggesting that it is directly associated with the lithiation process. Such streaks in reciprocal space, penetrating through the (0006) SiC Bragg peak, are associated with the development of interfacial planes, such as surfaces and grain boundaries, in the SiC lattice and are oriented normal to the defect plane. This observation suggests that planar defects play a role in the lithiation process of SiC. This streak is tilted by an angle of ~8.5° with respect to the surface crystal truncation rod (CTR) in this two-dimensional projection image of the RSM. From inspection of the full 3D RSM, the upper bound for the tilt of the planar defect orientation with respect to the SiC surface plane is approximately 10°. The specific orientation of this streak could not be assigned to any known grain boundary structures in SiC. This new defect structure could be explained by a number of phenomena including faceting, grain boundaries, or the development of a plane with increased Li concentration (Gao, Y. et al., *J. Cryst. Growth* 2010, 312, 2909-2913; Nordlund, K. et al., *Appl. Phys. Lett.* 2000, 76, 846-848; and Zhang, H. et al., *Phys. B* 2008, 403, 2008-2014, all incorporated herein by reference). The lithiation process may create these defects, or the Li may interact with defects that are already present, e.g. created by thermal annealing, thereby making the streaks more visible in the RSM. Since the EELS and IXS measurements suggest a Li stoichiometry as high as 1:1, it is apparent that the lithiation of this defect structure cannot fully explain the bulk stoichiometry. It does, however, provide a potential mechanism for the penetration of lithium into the bulk SiC that does not rely entirely on bulk site diffusion.

Low Energy Electron Diffraction

Figure 10:
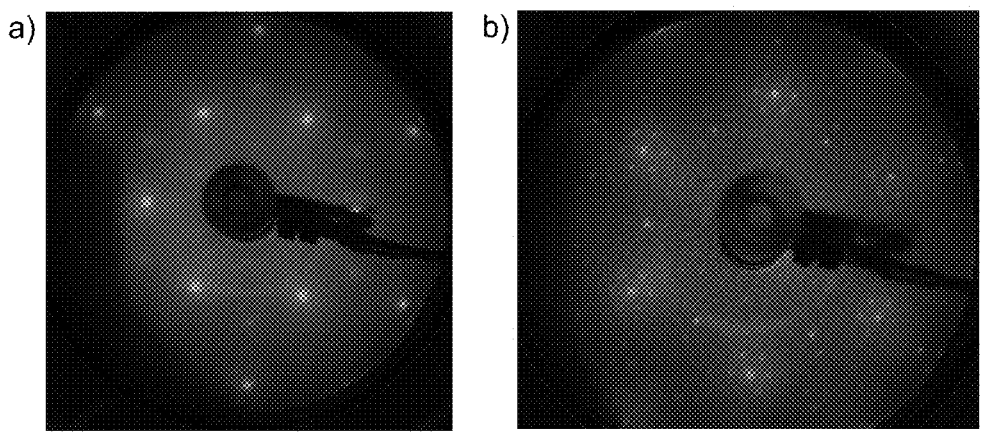
FIG. 10 are LEED images at 120 V for a) √3×√3 reconstructed SiC (0001) surface with preparation as described herein; and b) UHV graphitized SiC (0001) surface with preparation described in section 7. The pattern shows a combination of the (6√3×6√3)R30° and graphene layer.

Low energy electron diffraction (LEED) provides surface sensitive structural information and has previously been used to characterize the surface reconstruction during high temperature processing of SiC in UHV. The LEED image for a SiC sample, with the same preparation as the √3×√3 sample described in section 7 except the final flash is 6 minutes instead of 5 minutes at 1100° C., is shown in FIG. 10a. The pattern matches that seen previously for the √3×√3 reconstruction. The LEED image of an EG/SiC sample is shown in FIG. 10b. It shows the pattern seen previously for a SiC sample that has graphene present.

Cyclic Voltammetry

Figure 7:
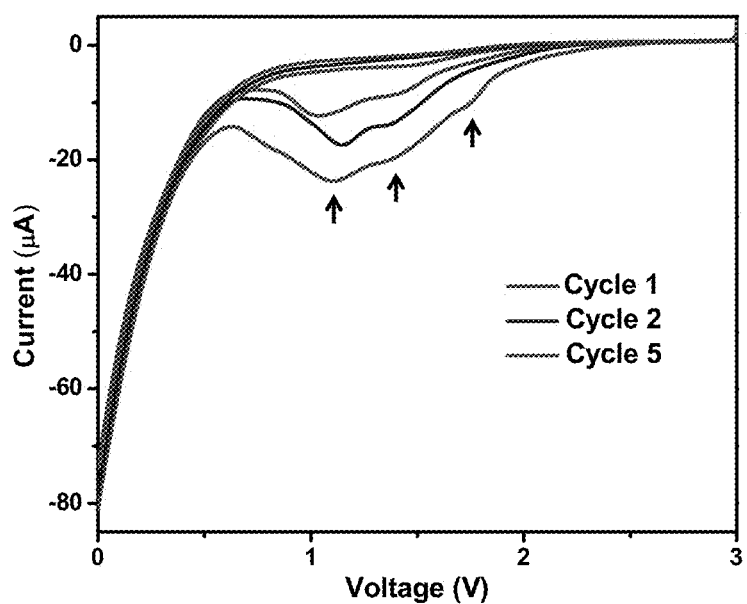
FIG. 7 is a cyclic voltammetry of a graphitized n-type doped SiC wafer between 0 and 3 V at a rate of 10 μV/s.

Cyclic voltammetry yields additional information about the voltages at which various electrochemical reactions occur. There are 3 peaks seen in FIG. 7 (indicated by arrows) during the negative direction sweep of cycle 1. In later cycles, only 2 peaks are seen indicating changes in the SEI formation and lithiation. These peaks may indicate SEI formation or may involve the lithiation of the SiC. At low voltages (0 V-0.5 V), the breakdown of the electrolyte and possibly lithiation of the SiC is occurring. Due to the slow kinetics of the lithiation of the EG/SiC, voltages below 3 V do not cause a positive current. However, there is an indication of a positive direction peak at approximately 1 V, which may indicate delithiation.

SIMS of the Lithiated and Delithiated EG/SiC

SIMS of a sample that is charged with 0.074 mAh cm$^{-2}$ of lithium and then split in half with one half being delithiated by 0.037 mAh cm$^{-2}$ is shown in FIG. 5a and FIG. 9. The SEI layer thickness (consequently SEI bulk interface) is determined from the corresponding SIMS depth profiles of F and O (FIG. 9). The dashed line in FIG. 9 at 125 nm indicates the interface between the SEI and the SiC. The F and/or O profile of the lithiated sample merges to that of the delithiated sample with a 21 nm right shift. It is noted that the SEI layer thickness increases (by ~20 nm) for the sample when it is delithiated after lithiation (FIG. 3), thus ruling out the possibility that the delithiation process corresponds to Li removal from the SEI only.

TEM and EELS Characterization of Highly Lithiated EG/Sic-C-Face

Cross-sectional TEM of the C-face of the lithiated EG/SiC sample used in FIG. 2 (Si-face) is shown in FIG. 11. There is a Pt beam induced deposited protective layer on top of the SEI layer to avoid any surface damage during sample preparation by using focused ion beam preparation methods. The EELS spectra, in FIG. 11b, are representative spectra at different depths of the sample namely at points A, B, and C at approximately 0.8, 2.8, and 3.8 μm depths into the SiC, respectively. The line in FIG. 11a represents the path along which EELS data has been collected. FIG. 11 shows that the Li—K edge does not diminish over a 3.8 μm range in depth into the SiC crystalline region for the C-face (inset). Background corrected Li—K edge from approximately 3.8 μm inside the SiC crystalline region is shown in the inset of FIG. 11. The Li—K edge intensity is similar to that of the Si-face (FIG. 2).

EELS Analysis Methodology

To achieve an accurate quantitative analysis of EELS data, first the multiple inelastic scattering contribution, due to the sample thickness, is removed from the EELS spectrum using the Fourier-Log deconvolution technique in the Gatan Digital Micrograph software. The Fourier-Log methodology utilizes the whole spectra including the zero loss region to model the multiple scattering (Brydson, R. in *Electron Energy Loss Spectroscopy*, Taylor & Francis, New York 2001 and Egerton, R. F. in *Electron Energy-Loss Spectroscopy in the Electron Microscope*, Plenum Press, New York 1996, both incorporated herein by reference). Applying this technique provides an output spectrum, known as single scattering distribution (SSD), which is corrected for the thickness effect.

In order to quantify the elemental analysis, it is necessary to accurately measure the intensities under the various edges. To achieve this, the background is fit using a power-law model of the form, $I=A \cdot E^{-r}$, where I is the intensity in the channel of energy loss, E. A and r are constants found via curve fitting. The fitting parameters are only valid over a limited energy range because they are dependent on E, therefore the background is fit to the spectrum immediately before the edge to be analyzed. This is then subtracted, and the intensity is integrated in an energy window, Δ, which begins at the edge threshold to 42.3 eV above the edge.

The next step is to compute the inelastic partial cross-section, σ. The partial cross-section is used to normalize the measured edge intensity so that either different edge intensities are compared, or the intensity is directly interpreted in terms of an elemental concentration within the specimen volume irradiated by the electron probe. Cross-sections are determined by using the Hartree-Slater model in the Gatan Digital Micrograph software (Leapman, R. D. et al., *J. Chem. Phys.* 1980, 72, 1232-1243 and Ahn, C. C. Et al., *Ultramicroscopy* 1985, 17, 105-115, both incorporated herein by reference).

The measured integrated edge intensity, $I_x$, for the element of interest from a specimen of thickness t is given by equation (1), $$I_x(\alpha,\beta,\Delta,E_0) = I_{LL}(\alpha,\beta,\Delta,E_0) \cdot \sigma_x(\alpha,\beta,\Delta,E_0) \cdot n_x \cdot t \quad (1)$$

where α is the convergence angle of the beam, β is the collection angle, and $E_0$ is the incident electron energy. $I_{LL}$ is the integrated intensity of the zero-loss and low loss signals over the same energy window Δ, and $n_x$ is the volume concentration of the element of interest.

The ratio of two elemental volume concentrations (x and y) in the probed volume is then determined using equation (2) for fixed α, β, Δ and $E_0$.

$$\frac{n_x}{n_y} = \frac{\sigma_y(\alpha,\beta,\Delta,E_0)}{\sigma_x(\alpha,\beta,\Delta,E_0)} \cdot \frac{I_x(\alpha,\beta,\Delta,E_0)}{I_y(\alpha,\beta,\Delta,E_0)} \quad (2)$$

where $I_x$ and $I_y$ are the measured integrated intensities under the x and y elemental (core loss) edges and $\sigma_x$ and $\sigma_y$ are the calculated partial cross-section for the x and y elemental edges.

EELS Characterization of Lithiated EG/SiC and C Atomic Concentration with Respect to Si Li and C atomic concentrations with respect to Si are estimated from the EELS depth profile for the highly lithiated (14 mAh cm$^{-2}$) EG/SiC sample (Si-face). FIG. 12 (Li and C atomic concentration with respect to Si as a function of depth; SiC surface starts at 0.612 μm) indicates that the Li to Si ratio is {1±0.2}:1. The C to Si ratio is {1±0.15}:1, as expected for SiC.

TEM and EELS Characterization of Lithiated EG/SiC

To confirm that the FIB method for TEM sample preparation is not transferring the Li from the SEI into the bulk SiC, the traditional sample preparation technique for a similar ~18.4 mAh/cm$^2$ lithiated EG/SiC (highly lithiated) sample is also used (Norimatsu, W. et al., *Chem. Phys. Lett.* 2009, 468, 52-56, incorporated herein by reference). In particular, thin specimens for cross-sectional TEM observation are prepared by the following procedure: the sample is cut into thin slices normal to the interfaces which are glued together between spacers. The sample (in sandwiched form) is then mechanically polished to ~100 μm in thickness, and the center of the sample is thinned by dimple grinding, followed by Ar-ion beam thinning at a low angle of ~10° at 5 keV.

FIG. 8 shows a representative HRTEM image of the ~18.4 mAh cm$^{-2}$ lithiated EG/SiC sample, observed along the [3 1 $\bar{2}$ 0] direction. The SiC (0006) crystal structure is clearly observed in the highly lithiated EG/SiC system. In this particular sample, the graphene layers are not distinguished, which is possibly due to surface damage from the preparation technique. The SAD pattern (shown as an inset) further indicates that the SiC structure is intact in most of its 10 μm sampling area. The EELS spectrum, in FIG. 8b, is a representative spectrum for the Li—K edge (background corrected) from approximately 1 μm inside the sample. FIG. 8c shows that the Li—K EELS peak does not diminish over a 1 μm range in depth. The initial increase (ramp up) of Li signal with increasing depth from the sample surface up to ~0.4 μm is an effect of sample thickness variation near the surface. This observation, i.e. increase of the Li signal with increasing depth, rules out the possible explanation that the origin of Li signal inside the sample is the result of the ion-milling process.

EXPERIMENTAL

H—SiC single crystal wafers of approximately 250 μm thickness and doped n-type by nitrogen to a resistivity between 0.02 Ω·cm and 0.2 Ω·cm are purchased from CREE. The area of the samples is measured using digital calipers with an error of 3%. Samples are sonicated in acetone and isopropanol before use, and samples in this condition are termed "as-received."

EG/SiC samples are produced in a UHV chamber with a base pressure below 1×10$^{-10}$ Torr unless otherwise noted. The SiC is resistively heated by passing current through the SiC while temperatures are monitored using an optical pyrometer (Cyclops) at an emissivity of 0.85. The SiC is degassed overnight at 600° C. and then annealed for 2 minutes at 1000° C. The SiC is then flashed 3 times at 1100° C. for 2 minutes each. After each flash, the sample is allowed to cool for 10 minutes. Finally, the SiC is graphitized at 1300° C. for 2 flashes and then 10 flashes at 1350° C. for 1 minute apiece.

The SiC with √3×√3 reconstruction is prepared in UHV by first degassing at 600° C. overnight and then annealing for 2 minutes at 1000° C. It is then flashed at 1100° C. for 5 minutes. The furnace-annealed sample is annealed by ramping to 1100° C. at 5° C. min$^{-1}$ and then immediately cooled at 5° C. min$^{-1}$ in an alumina tube under a flow of 99.999% argon gas at atmospheric pressure. The polished EG/SiC sample is polished using diamond lapping paste with 0 to 0.5 μm particle size (McMaster Carr). Atomic force microscopy topography imaging shows that the graphene structure is removed and that polishing introduced some additional scratches into the surface. The undoped EG/SiC sample is first hydrogen etched and then graphitized at 1620° C. for 2 hours in an argon atmosphere at 100 mbar (75 Torr).

Electrochemical lithiation and/or delithiation is performed using two-electrode beaker type cells with Li metal as the counter electrode. A 1 M LiPF$_6$ (99.99%, Sigma Aldrich) in 1:1 by volume ethylene carbonate to dimethyl carbonate (Anhydrous, Sigma Aldrich) electrolyte is used. Galvanostatic charging is performed using a current source (Keithley 220) set to 10 μA and a multimeter is used to measure voltage (Keithley 2001 or 2002) versus Li metal. First lithiation capacity is found by lithiating the sample to 0 V repeatedly until the open circuit voltage is under 0.5 V after 8 hours.

TEM samples are prepared by standard FIB lift-out preparation methods using a Helios NanoLab dual beam FIB/SEM (FEI) unless otherwise noted (Langford, R. M. et al., *J. Vac. Sci. Technol., A* 2001, 19, 2186-2193, incorporated herein by reference). TEM images and electron energy loss spectroscopy (EELS) spectra are taken on a JEM-2100F TEM (JEOL) at 200 kV. EELS, in combination with scanning transmission electron microscopy (STEM) with 1 nm spot size, is performed using a post column Gatan imaging filter fitted to the field emission JEOL TEM. The spectra are obtained with a spectrometer dispersion of 0.5 eV/channel. Quantitative elemental analysis is performed using Gatan Digital Micrograph software with background subtraction and corrections for plural scattering.

Inelastic X-ray scattering (IXS) is performed at sector 20ID-B at the Advanced Photon Source (APS) at Argonne National Laboratory (Fister, T. T. et al., *Rev. Sci. Instrum.* 2006, 77, 063901, incorporated herein by reference). The energy loss is scanned by adjusting the incident energy with a two crystal Si (111) monochromator while keeping the scattered energy fixed such that each Si analyzer is at the (555) Bragg condition ($E_2$=9891 eV). Quasielastic scattering is used to calibrate the energy loss and determine the overall resolution (1.3 eV). Data are collected at incident angles of 0.6°, 1.3°, 2°, and 11°, which have 1/e penetration depths of 0.5, 1.1, 1.6, and 8.5 µm into SiC, respectively.

FIB and SEM are taken using the Helios NanoLab dual beam FIB/SEM (FEI). It should be noted that the SEM images are taken at a 52° to the surface of the cross-section, giving a view of both the top surface of the sample as well as the cross-section. SIMS depth profiling is performed with a time of flight SIMS Trift-III system (Physical Instruments) using a 5 kV Ga pulsed sputtering system. The sputtered region is 100 µm×100 µm and the region analyzed is 25 µm×25 µm to minimize redeposition from the edges into the analyzed region.

In situ X-ray reflectivity measurements are performed at sector 5ID-C and 33ID-D at the APS at Argonne National Laboratory using 17.00 keV x-rays with a beam size of 1.0 mm horizontally and 0.1 mm at 5ID-C and 0.3 mm at 33ID-D vertically. Scattered X-rays are detected using an X-ray CCD area detector (Princeton Instruments 7501-0002). Reflectivity of the SiC Bragg peak is also measured using a point detector (Cyberstar) with a beam size of 0.05 mm vertically and 1 mm horizontally. Samples are contained in a custom made electrochemical cell with a 7 µm thick Kapton window. The reflectivity data, extracted from the CCD 2D pixel maps, are least-squares fitted with a crystal truncation rod (CTR) formalism (Fenter, P. et al., *J. Synchrotron Radiat.* 2006, 13, 293-303, incorporated herein by reference) for a parameterized model of the electron density profile shown in FIG. 6*b*.

DISCUSSION

A 57-fold enhancement of the first lithiation capacity of doped SiC via high temperature processing is demonstrated. TEM and EELS results show that the lithium stoichiometry has an approximately 1:1 ratio with Si within at least the top 3 µm of the SiC surface. IXS and SIMS further confirm that the lithium extends further into the bulk than F and O species that are associated with the SEI layer. The XRR results show that there is little change to the graphene layers upon lithiation, consistent with the HRTEM results. Unlike Si, which amorphizes starting at the surface during lithiation (Goldman, J. L. et al., *Adv. Funct. Mater.* 2011, 21, 2412-2422, incorporated herein by reference), the EG/SiC surface remains intact. However, there is a substantial drop in the SiC (0006) Bragg peak intensity, which indicates some change to the bulk SiC crystallinity, which is likely due to the development of defects. Also, IXS data shows a change in the Si near-edge structure, which can be explained by changes to the Si environment, mostly likely due to its interaction with Li. Therefore, it is concluded that Li penetrates into the bulk of SiC upon electrochemical lithiation of doped EG/SiC.

Several factors may contribute to the enhanced lithiation of doped EG/SiC compared to as-received SiC. For example, sufficient electrical conductivity of the surface and substrate are necessary to allow for electron transfer. This combination is achieved in doped SiC following removal of the native oxide via high temperature vacuum annealing. In particular, vacuum annealing to the point of epitaxial graphene formation results in an electrically conductive, chemically passivated surface that provides long term protection against surface oxidation and thus appears to be the most relevant and promising for long-term electrochemical studies and applications. The carbon-rich subsurface reconstruction and/or the development of defects in the bulk crystal during high temperature processing may also facilitate Li diffusion in SiC. From the TEM and XRR results, it is apparent that Li penetrates deep into the crystal without substantial changes in lattice constant. While the RSM suggests that defects may facilitate Li diffusion and provide sites for Li incorporation, the high Li:Si stoichiometry obtained by EELS and IXS suggests that incorporation at defects is insufficient to explain the observed stoichiometry and that Li also resides in the bulk crystal lattice. It is also possible that regions of the SiC are amorphizing to accommodate Li. If such regions exist, they would likely need to be on the order of a few nanometers in size, such that the approximately 100 nm thick TEM samples would appear relatively uniform. To explain the stoichiometry, approximately 20% of the crystal would need to amorphize, assuming ideal Li capacity for the amorphized Si atoms. While some small variations in the TEM images are observed in the SiC crystalline regions, it is difficult to definitively attribute these variations to defects, amorphization, or issues of sample preparation.

Graphitization of doped SiC activates the inert SiC for lithiation, thus enabling substantially increased lithium incorporation in the bulk crystal. EELS analysis shows that Li is present in a stoichiometry as high as $\{1\pm0.2\}$:1 ratio of Li to Si. This apparent stoichiometry corresponds to a Li-ion capacity of 670±130 mAh/g, which is approximately double that of the graphite anodes currently used in Li-ion batteries. The enhanced lithiation requires substantial electrical conductivity of the substrate and surface, which is enabled by doping and removal of the native oxide via graphitization, respectively. Since the crystalline matrix of the SiC does not undergo the substantial lattice strain that is commonly encountered in many other high capacity anode materials, doped EG/SiC is a promising candidate for long lifetime, high capacity battery anodes. Perhaps more significantly, a relatively straightforward surface treatment is sufficient to convert SiC from an inactive, inert substrate into an electrochemically active host for Li. This ability to substantially enhance lithiation via surface modification highlights the importance of interfacial engineering as an alternative pathway for identifying and engineering materials for next generation Li-ion battery electrodes. The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. A method for increasing the Li-ion capacity of a silicon carbide comprising:
   providing a doped silicon carbide; and
   heat treating the doped silicon carbide in an inert atmosphere, and electrochemical lithiation of the heat-treated doped silicon carbide, wherein lithiation capacity of the heat-treated doped silicon carbide is greater than lithiation capacity of the doped silicon carbide.

2. A method according to claim 1 wherein the doped silicon carbide is doped 6H-SiC (0001).

3. A method according to claim 2 wherein the doped 6H-SiC (0001) is n-type 6H-SiC (0001).

4. A method according to claim 1 wherein lithiation capacity of the heat-treated doped silicon carbide is up to 57-fold greater than lithiation capacity of the doped silicon carbide.

5. A method according to claim 3 wherein lithiation capacity of the heat-treated n-type 6H-SiC (0001) is up to 57-fold greater than lithiation capacity of the n-type 6H-SiC (0001).

6. A method according to claim 1 wherein the inert atmosphere is argon at atmospheric pressure.

7. A method according to claim 1 wherein the inert atmosphere is argon at less than atmospheric pressure.

8. A method according to claim 1 wherein the inert atmosphere has a pressure below $1 \times 10^{-5}$ Torr.

9. A method according to claim 1 wherein the inert atmosphere has a pressure below $1 \times 10^{-9}$ Torr.

10. A method according to claim 9 wherein the inert atmosphere has a pressure below $1 \times 10^{-10}$ Torr.

11. A method according to claim 1 wherein the doped silicon carbide is heat treated to at least about 1100° C.

12. A method according to claim 1 wherein the heat-treated doped silicon carbide has $\sqrt{3} \times \sqrt{3}$ surface reconstruction.

13. A method according to claim 1 wherein the heat-treated doped silicon carbide has $(6\sqrt{3} \times 6\sqrt{3})R30°$ surface reconstruction.

14. A method according to claim 13 wherein the heat-treated doped silicon carbide has the $(6\sqrt{3} \times 6\sqrt{3})R30°$ surface reconstruction and graphitic layers on the surface.

15. A method according to claim 14 wherein the graphitic layers are a mixture of single and bilayer graphene.

16. A method according to claim 14 wherein the graphitic layers are multiple layers of graphene.

17. A method according to claim 1 wherein lithiation of the heat-treated doped silicon carbide results in 1:1 Li to Si ratio within at least the top 3 µm of the silicon carbide surface.

18. An anode for a lithium-ion battery, wherein the anode comprises an increased lithium-ion capacity of silicon carbide prepared by a method according to claim 1.

19. A lithium-ion battery comprising an anode according to claim 18.

20. A method according to claim 1 wherein the doped silicon carbide is selected from the group consisting of silicon carbide wafer or silicon carbide powder.

* * * * *